(12) United States Patent
Rakib

(10) Patent No.: US 8,365,237 B2
(45) Date of Patent: Jan. 29, 2013

(54) METHOD OF CATV CABLE SAME-FREQUENCY TIME DIVISION DUPLEX DATA TRANSMISSION

(76) Inventor: Selim Shlomo Rakib, Cupertino, CA (US)

( * ) Notice: Subject to any disclaimer, the term of this patent is extended or adjusted under 35 U.S.C. 154(b) by 165 days.

(21) Appl. No.: 13/035,993

(22) Filed: Feb. 27, 2011

(65) Prior Publication Data

US 2011/0185394 A1    Jul. 28, 2011

Related U.S. Application Data

(63) Continuation-in-part of application No. 12/692,582, filed on Jan. 22, 2010, and a continuation-in-part of application No. 12/907,970, filed on Oct. 19, 2010.

(60) Provisional application No. 61/385,125, filed on Sep. 21, 2010.

(51) Int. Cl.
*H04N 7/173* (2011.01)
(52) U.S. Cl. .................. 725/111; 725/116; 709/229
(58) Field of Classification Search .......... 725/106–126; 709/217–232
See application file for complete search history.

(56) References Cited

U.S. PATENT DOCUMENTS

| | | | | |
|---|---|---|---|---|
| 5,115,451 A * | 5/1992 | Furlong | ................. | 375/221 |
| 5,761,603 A * | 6/1998 | Nojima et al. | ................. | 725/131 |
| 6,075,972 A * | 6/2000 | Laubach et al. | ............. | 455/3.05 |
| 6,349,138 B1 * | 2/2002 | Doshi et al. | ................. | 380/200 |
| 6,393,110 B1 * | 5/2002 | Price | ................. | 379/93.01 |
| 6,449,250 B1 * | 9/2002 | Otani et al. | ................. | 370/219 |
| 6,757,253 B1 * | 6/2004 | Cooper et al. | ................. | 370/241 |
| 6,765,931 B1 * | 7/2004 | Rabenko et al. | ............. | 370/493 |
| 7,222,255 B1 * | 5/2007 | Claessens et al. | ........... | 714/4.12 |
| 7,292,835 B2 * | 11/2007 | Sorrells et al. | ................. | 455/313 |
| 7,372,900 B2 * | 5/2008 | Rapaport | ................. | 375/222 |
| 7,505,692 B2 * | 3/2009 | Best | ................. | 398/182 |
| 7,885,195 B2 * | 2/2011 | Volpe et al. | ................. | 370/244 |

* cited by examiner

*Primary Examiner* — Annan Shang
(74) *Attorney, Agent, or Firm* — Stephen E. Zweig

(57) ABSTRACT

Method of bidirectional Time Division Duplex (TDD) data transmission over the same RF frequency ranges of a CATV cable system. The system's slave modem clocks are time synchronized to the master clock of a master modem. The master-to-slave signal propagation times are determined and used to precisely schedule transmissions with de-minimize guard times. The frequency range may be chosen to be in the high frequency CATV range around 1 GHz to maximize backward compatibility with legacy systems, and this frequency may in turn be subdivided into multiple frequencies. In some embodiments, the CATV cable tree may be further partitioned into multiple TDD domains, and multiple local master modems, connected by a special-use optical fiber, may communicate with multiple local slave modems. The system may use MAP allocation schemes that may frequently reallocate TDD time slots and frequencies according to current or projected slave modem data needs.

28 Claims, 8 Drawing Sheets

METHOD OF CATV CABLE SAME-FREQUENCY TIME DIVISION DUPLEX DATA TRANSMISSION

CROSS REFERENCE TO RELATED APPLICATIONS

This application is a continuation in part of U.S. patent application Ser. No. 12/692,582, "DISTRIBUTED CABLE MODEM TERMINATION SYSTEM" filed Jan. 22, 2010, inventor Selim Shlomo Rakib; this application is also a continuation in part of U.S. patent application Ser. No. 12/907,970, "HFC CABLE SYSTEM WITH SHADOW FIBER AND COAX FIBER TERMINALS", filed Oct. 19, 2010, Inventor Selim Shlomo Rakib; this application also claims the priority benefit of U.S. provisional application 61/385,125 "IMPROVED HYBRID FIBER CABLE SYSTEM AND METHOD", filed Sep. 21, 2010, inventor Selim Shlomo Rakib. The contents of all of these applications are incorporated herein by reference.

BACKGROUND OF THE INVENTION

1. Field of the Invention

The invention is in the general field of Cable Television and Hybrid Fiber Cable systems, particularly with regard to providing extended features and Internet access.

2. Description of the Related Art

Cable television (CATV), originally introduced in the late 1940's as a way to transmit television signals by coaxial cables to houses in areas of poor reception, has over the years been modified and extended to enable the cable medium to transport a growing number of different types of digital data, including both digital television and broadband Internet data.

Over the years, this 1940's and 1950's era system has been extended to provide more and more functionality. In recent years, the CATV system has been extended by the use of optical fibers to handle much of the load of transmitting data from the many different CATV cables handling local neighborhoods, and the cable head or operator of the system. Here the data will often be transmitted for long distances using optical fiber, and the optical (usually infrared light) signals then transformed to the radiofrequency (RF) signals used to communicate over CATV cable (usually in the 5 MHz to 1-GHz frequencies) by many local optical fiber nodes. Such systems are often referred to as hybrid fiber cable systems, or HFC systems. The complex electronics that are used by the cable operator to inject signals (e.g. data) into the system, as well as extract signals (e.g. data) from the system are often referred to as Cable Modem Termination Systems or CMTS systems.

In a typical HFC system, at the various optical fiber nodes, the optical fiber signals are transformed back into RF signals and are then carried by the various neighborhood CATV coax cables to various households. Unlike fiber, which can carry optical signals for extensive distances without significant signal strength attenuation, the RF signals attenuate fairly rapidly as a function of distance over the CATV coax cables. This attenuation versus distance function increases as the frequency of the RF signals increases. For example, using RG-59 cable, at 10 MHz, the RF signal attenuation versus distance is about 1.1 dB/100 feet, at 100 MHz, the RF signal attenuation versus distance is about 3.4 dB/100 feet, at 400 MHz, the attenuation rate is 7.0 dB/100 feet, and at 1000 MHz (1 GHz), the attenuation rate is 12 dB/100 feet. Other types of coax cables, such as RG-6 cables, have lower attenuation versus distance characteristics, but the same sort of attenuation problem still exists.

Thus, in order to maintain the RF signal of the various upstream and downstream signals while traveling over neighborhood CATV coax cables, neighborhood CATV systems typically employ various active (powered) devices, such as powered forward and reverse (bidirectional) RF amplifiers and the like. At present, using CATV systems that often have a maximum frequency of about 550 or 850 MHz, these active devices are often spaced about every 1000 feet.

Each active device can have several (e.g. 1-4) neighborhood CATV sub-cables connected to it, and often to maintain RF power over cable distances of several thousand feet, more than one (usually 1-3) active devices can be connected along a single stretch of coax cable. As a result, at a neighborhood level, the coax cable wiring pattern of CATV systems often has a "tree" like structure, where the branches of the tree spring off of the various active devices. The first or main CATV coax cable that connects to the RF signal originating from the optical fiber node is often referred to as the "trunk" cable, and the various coax cables that split off of the trunk cable are often referred to as branch cables, and the branch cables in turn can have other branch cables splitting off of them as well. As the various trunk and branch cables cover the local neighborhood, and generally situated in between the various active devices, various taps, splitters, and drops on the neighborhood or "trunk" CATV cable connect various households to the CATV cable. In order to provide power for the various active devices, often the CATV coax cable system will carry electrical power as well. As might be expected, the process of negotiating easements and right of way to route the neighborhood CATV cables is burdensome, however this process has been going on for over 50 years in various parts of the country, and by now is well established.

At present, for United States CATV systems, the 5-42 MHz frequency region is generally reserved for upstream communications back from the various cable modems to the cable plant, and the majority of the bandwidth, typically in the 54-547+MHz range (often the upper end extends to 865 MHz and beyond) is reserved for downstream communications from the cable plant to the various households. European CATV systems follow a slightly different scheme where the upstream communications frequencies extend up to the 60 MHz region. Due to rapid signal attenuation, the higher frequencies above about 750 to 865 MHz (here referred to generically as 1 GHz+frequencies) are seldom used at present.

A more detailed discussion of prior art in this field can be found in copending application Ser. No. 12/692,582, the contents of which are incorporated herein by reference.

Prior art work with various types of CMTS systems and fiber nodes includes Liva et. al., U.S. Pat. No. 7,149,223; Sucharczuk et. al. US patent application 2007/0189770; and Amit, U.S. Pat. No. 7,197,045.

BRIEF SUMMARY OF THE INVENTION

Prior art CATV data transmission schemes were limited, particularly for upstream transmissions in which various household (slave) modems attempted to send data upstream to the CATV cable plant, by a relatively narrow upstream bandwidth allocation range (typically 5 to 42 MHz in the US). The prior art CATV upstream transmission schemes were further limited by an inefficient data transmission format that only allocated a small frequency range and a small time slice to the various slave modems. These allocated time slices were typically separated by large and inefficient guard times, in which no data was transmitted. Thus, as will generally be well known by many CATV broadband cable subscribers, upstream rates of data transmission were and are relatively slow. Although prior art CATV systems did allocate a much larger range of downstream frequencies for downstream communications from the Cable plant to the various neighborhood subscriber modems, this system, by pre-allocating the 54-860 MHz spectrum for downstream use only, was relatively inflexible.

Given the massive investment in prior art CATV systems, solutions that can provide increased upstream and downstream bandwidth to customers, while offering the potential to co-exist or be backward compatible with the extensive investment in neighborhood CATV cable trees and existing CATV systems, are desirable.

The invention is based, in part, on the insight that at any given time, generally only some of any given neighborhood's households will have a need to send large amounts of data upstream, and generally only some of these households will have a need to receive large amounts of a particular type of downstream data as well.

The invention is further based on the insight that for maximum flexibility, use of a flexible, dynamically allocated, Time Division Duplex data transmission format that uses the same frequency ranges to send both upstream and downstream data can be advantageous because in a dynamic allocation system, those particular modems that need to exchange more data in either an upstream or downstream direction can be allocated more time slots to send this data.

The invention is further based on the insight that the advantages of a Time Division Duplex data transmission format are diminished when the guard time (i.e. the "silent" or "dead" times between time slots that are allocated to a particular modem) become too large.

Differences in clock timing between different slave modems and the master modem require that the guard times be extended in length to be able to accommodate these differences. The invention is further based on the insight that in order to minimize guard times, the internal clocks of the various neighborhood or slave modems in a CATV system should be more tightly synchronized then they are at present. Ideally the internal slave clocks of the various slave modems should be precisely synchronized with the clock used by their local master modem.

Further, RF signals take time (even at near speed of light speeds), to propagate over the different lengths of CATV cable that extend between the various slave modems and the local master modem. Thus, given propagation time delays, signals sent out from two slave modems located different distances from their master modem, at exactly the same time, will arrive at the master modem at different times. To prevent confusion, the guard times must be extended to compensate for these timing differences. Thus in order to further minimize guard times, the slave modems should adjust the timing of their signals according to the signal propagation time from that particular slave modem to that particular local master modem.

In some embodiments of the invention, the local master modem's clock is assigned to be the master clock, at least for those particular neighborhood slave modems engaged in TDD communications with this particular master modem. The master modem may send out suitable timekeeping signals to the various CATV slave clocks onboard the various CATV slave modems, thus ensuring that the various local slave clocks are precisely tuned to the same time as the local master modem's clock. To compensate for signal propagation delays and other internal delays inside the local slave modems, the local master modem may engage in a ranging process, in which it sends signals out to each of the various slave modems, and determines the propagation time to each respective slave modems. The slave modems can then be informed of this propagation time "d", and use this propagation time as a correction factor, along with their master-modem-synchronized slave clocks, to ensure that their particular TDD transmission slots are transmitted at the correct time. Thus for example, if a slave modem is assigned to commence transmission at master time T, then the slave clock may actually commence transmission at master time T−d, so that after propagation time d, the master modem sees the signal from that particular slave modem arriving at the correct assigned time T. This enables the guard times to be set to an extremely low, de-minimis, value.

In a typical HFC CATV cable system, there are generally a plurality of optical fibers that carry signals from the HFC CATV cable head or plant to a plurality of different neighborhoods, each neighborhood of being served by RF signals coming and going along that particular neighborhood's CATV cable tree. Thus each neighborhood will usually have at least one local master modem that sends and receives TDD signals along that particular neighborhood's CATV cable tree.

Sometimes there may be multiple local master modems along a single neighborhood CATV cable tree. For example, some embodiments of the invention may utilize the shadow optical fiber and Coax Fiber Terminal methods described in parent and copending application Ser. No. 12/907,970, the contents of which are incorporated herein by reference. In these embodiments, some or all of the various Coax Fiber Terminals that are located along a neighborhood CATV cable tree may function as local master modems as well. In these embodiments, each local master modem will generally engage in bidirectional, same frequency, TDD communications only with its local slave modems.

In general, the concepts discussed herein will apply regardless of if there is a single master modem on the CATV cable tree, or a plurality of local master modems on the CATV cable tree. Thus the terms "local master modem" and "master modem", as well as the terms "local slave modem" and "slave modem", will generally be used in an interchangeable manner in this specification.

In one embodiment, the invention may be a method of bidirectional Time Division Duplex data transmission over the same RF frequency ranges of a CATV cable system. This CATV cable system may be a Hybrid Optical Fiber cable system, in which data communications to a central CATV cable plant or head will often be done with optical fiber, and the data connections to various household modems (here called slave modems) will often proceed by way of RF signals carried over at least one neighborhood CATV cable, which usually will have a tree-like topology.

Here, the CATV cable system will generally comprise at least one CATV cable tree, and this at least one CATV cable tree will in turn have at least one local master modem (often located at the root of the local RF section of the CATV cable tree, or alternatively configured at multiple locations on the CATV cable tree if multiple local master modems are contemplated) with a master clock. Along each CATV cable tree, there will generally be a plurality of slave modems connected at various locations and distances along the cable, and each slave modem will be configured with a slave clock.

Along the CATV cable system, there will usually be at least a nearest slave modem that is generally located along the shortest stretch of CATV cable from the local master modem, so that the signal propagation time from this nearest slave modem to the local master modem is at a minimum, and a furthest slave modem, generally located along the longest stretch of CATV cable from the local master modem, so that the signal propagation time from this furthest slave modem to the local master modem is at a maximum.

The communications method will generally comprise time synchronizing the slave clocks of this plurality of (local) slave modems to the master clock of the (local) master modem. Then the signal propagation times between this master modem and each of the plurality of slave modems is determined. The invention may also determine the current or projected upstream and downstream data needs for each of the plurality of slave modems. This can be done by having the slave modems request time slots for data transmission, and/or the master modem can allocate time slots based on patterns of past use and slave modem priority assessments. According to the invention, the (local) master modem may use these signal propagation times and said current or projected upstream and downstream data needs for each of this plurality of slave modems to dynamically construct various Mini-slot Allocation Packet (MAP) Time Division Duplex (TDD) allocation schemes, and transmitting these MAP Time Division Duplex allocation schemes to each of the plurality of slave modems. The (local) master modem and the (local) slave modems may then use these MAP Time Division Duplex allocation schemes to control the bi-directional data transmission between the (local) master modem and the plurality of (local) slave modems. These MAP schemes can be dynamically changed and updated according to a predetermined schedule or as changing use patterns dictate.

Although in some embodiments, the master modem may be configured to only perform the bidirectional TDD communications discussed in this specification, in other configurations, the master modem may be configured for additional functionality as well. Often the master modem may additionally comprise, or at least be associated with, a HFC (Hybrid Fiber Cable) optical fiber node. For example, consider a CATV cable system in which the bandwidth below 860 MHz is relegated to prior art CATV transmissions, and a 100 MHz portion of the spectrum above 860 MHz, such as 900 MHz to 1000 MHz (1 GHz), is allocated for bidirectional TDD data transmission.

Thus, for example, the master modem discussed in this disclosure may be part of the same "box" or device that in addition to performing TDD transmission with the various neighborhood or CATV cable tree slave modems, also handles the standard CATV transmissions below 860 MHz. Thus the master modem may be a combination HFC optical fiber node and a master TDD modem. In other embodiments, the master modem may also act as a Cable Modem Remote Terminal System (CMRTS) or D-CMRTS according to the teachings of parent and copending application Ser. Nos. 12/692,582 and 61/385,125, the contents of which are incorporated herein by reference.

As previously discussed, in some embodiments, the master modem may not function as a standard or enhanced optical fiber node in the traditional sense, but rather may operate as a new type of Coax Fiber Terminal (CFT) according to the teachings of parent and copending application Ser. No. 12/907,970, the contents of which are incorporated herein by reference.

DETAILED DESCRIPTION OF THE INVENTION

Figure 1:
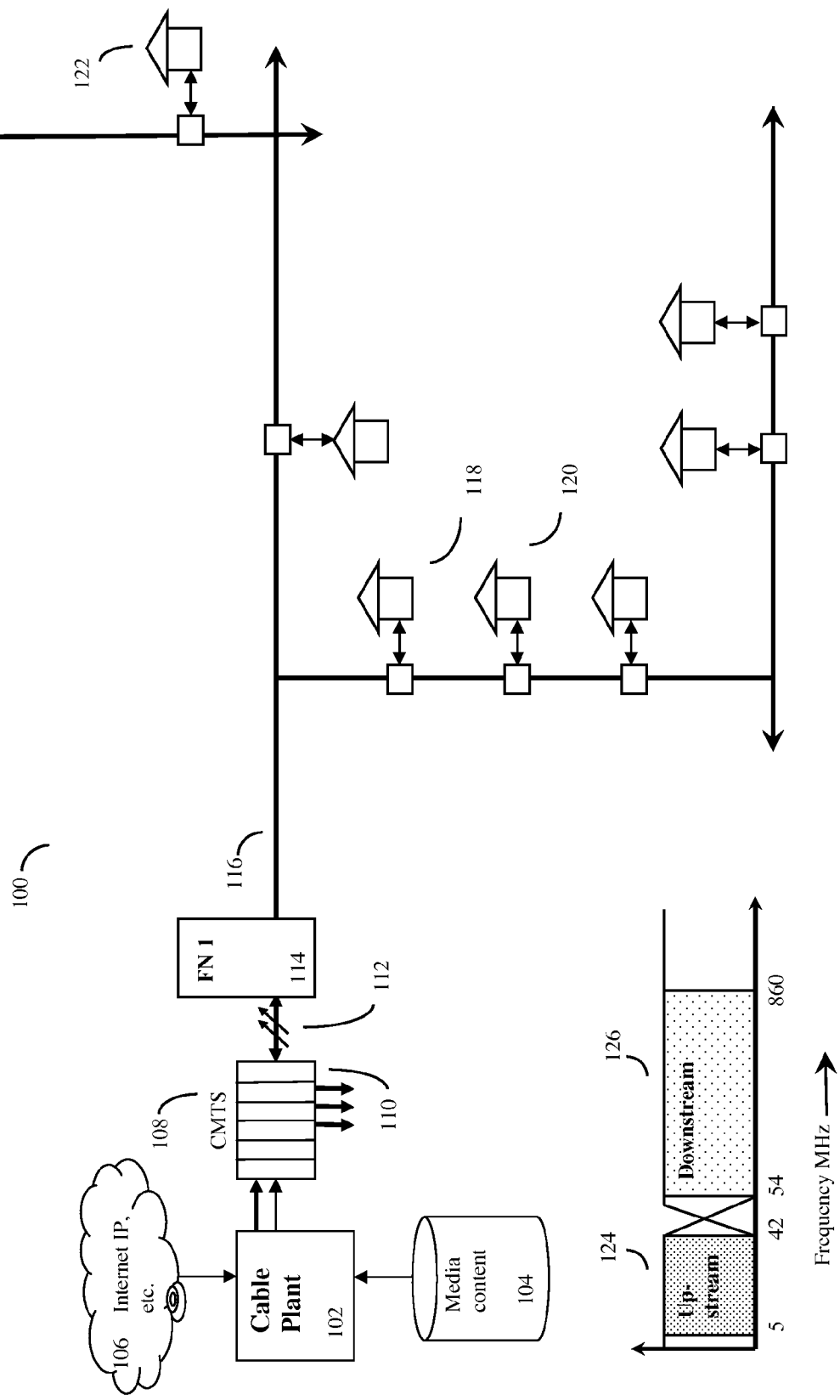
FIG. 1 shows a diagram of the inverted tree topology of the neighborhood RF portion of a typical CATV cable system.

FIG. 1 shows a drawing of the general CATV Cable system that will be used as a model to illustrate various embodiments of the invention. In this specification, many of the examples will be based on a hybrid fiber cable CATV system (100), in which a cable plant (102), which may have access to various media sources (104), the Internet (106), and the like. The cable plant will often manage at least some of the data using a Cable Modem Termination System (108) which is usually composed of various blades or modules (110). The cable plant sends data over a plurality of optical fibers (112) to optical fiber nodes (FN) (114) at various neighborhoods. At the optical fiber node, the optical signal is converted to various RF signals, and injected into the local neighborhood CATV cable tree, which then distributes the downstream RF signal. The optical fiber node (114) will also convert upstream RF signals back into optical signals, and send these back to the cable plant as well.

Each CATV cable neighborhoods will often be composed of hundreds of different households, offices, industrial sites and other locations with data needs. Here these sites or locations with data needs will generally be referred to as "households". Each household will generally have at least one modem (often called a slave modem) that can read the CATV RF signals, receive data, and send data. Here these slave modems are simply drawn as small "house" symbols.

In general, each neighborhood is wired with a CATV cable tree (116), which may be composed of various lengths of CATV cable, often connected together to form a tree-like structure by various splitters, directional couplers, and filters (not shown). There will also often be various active components, such as RF amplifiers as well (not shown), that can serve to boost the RF signals that can otherwise become attenuated after traveling through long lengths of cable. The optical fiber node (114) will transduce the downstream optical signals from the cable plant and CMTS (102), (108) into RF signals for the neighborhood CATV cable (116), and also transduce the upstream signals from the neighborhood CATV cable (116) back into optical signals for transmission back to the CMTS (108) and Cable plant (102). Some of the various households on this particular CATV cable tree, each of which will be assumed to have a local modem, are shown as (118), (120), and (122). Note that household (118) is the closest household to the optical fiber node (114) in terms of distance along the CATV cable, household (120) has a longer distance to the optical fiber node (114), while household (122) should be assumed to be the household with the longest distance to the optical fiber node (114).

In a typical US CATV cable system, the RF frequency range from 5 MHz to 42 MHz (124) is typically reserved for upstream communications from the slave modems in the various households (e.g. 118, 120, 122) to the local optical fiber node (114) and hence to the CMTS (108) and cable plant (102). The RF frequency range from 54 MHz to about 860 MHz (126) is reserved for downstream communications from the Cable plant (102) and CMTS (108) via the optical fiber node (114) to the various households (e.g. 118, 120, 122). The frequency range above 860 MHz is presently unused. This higher frequency range tends to be less desirable because of the higher rate of attenuation of the RF signal as a function of distance along the cable. Thus frequencies above about 860 MHz travel less far along the neighborhood CATV cable tree (116), and thus generally require more active components (e.g. RF amplifiers) or other measures (e.g. the shadow fiber and coax fiber terminal concepts of application Ser. No. 12/907,970) in order to avoid large amounts of signal loss.

Due to this signal loss, which becomes progressively worse as the frequency increases, although unallocated CATV bandwidth exists above 860 MHz, this tends to be "cheap real estate". The frequencies above about 1 GHz tend to become progressively less desirable. Thus any frequency allocation for extended CATV services, such as high bandwidth "Gigabyte to the home" services will tend to be comparatively limited relative to the present roughly 810 MHz frequency range (i.e. ~860 MHz-5 MHz) presently allocated for CATV use. For example, a future Gigabyte to the home CATV frequency allocation scheme might be allocated only about 100 MHz of bandwidth, for example in the 900 to 1000 MHz (1 GHz) range (see FIG. 2, 202), due to these high frequency attenuation problems. To make any future gigabyte to the home service as compelling and useful as possible, this relatively narrow slice of bandwidth (202) should ideally be utilized as efficiently as possible.

For purposes of illustration, many of the examples in this specification will be assumed to be utilizing a hypothetical new CATV bandwidth allocation between about 900 MHz and 1000 MHz (202), and this 100 MHz wide new bandwidth allocation will be assumed to be allocated for simultaneous upstream and downstream data transmission using Time Division Duplex methods in which some time slices along this new bandwidth allocation will be assigned for upstream transmission, and some time slices will be assigned for downstream allocation. These time assignments may be done through the use of Mini-slot Allocation Packet (MAP) messages exchanged between a CATV master modem (214), and the various slave modems (e.g. 118, 120 . . . 122) connected to various locations of the CATV cable tree (116) that is controlled by that particular master modem (214). In the example shown in FIG. 2, the master modem (214) also acts as the neighborhood's optical fiber node (114) as well, but this need not always be the case.

Mini-slot Allocation Packet messages are presently used under the CATV Data Over Cable Service Interface Specification (DOCSIS) specification. They describe a scheme in which various household modems may be allocated various times to transmit data upstream, and also various times in which a cable head modem may transmit downstream messages intended for specific household modems. Such methods are described in U.S. Pat. Nos. 6,643,295, 6,956,865, 7,748,002, the contents of which are incorporated herein by reference, and other patents.

Generally, such prior art CATV MAP schemes have previously tended to allocate different frequencies for upstream and downstream data transmission. For the present invention, the MAP allocation schemes will often allocate the same frequencies for upstream and downstream data transmission. The MAP allocation schemes for the present invention will often generally use much shorter guard times as well. Otherwise, however, the MAP schemes used by the present invention may be chosen or selected to be as backward compatible with prior MAP allocation schemes as possible, given the differences. Alternatively, the invention's MAP allocation scheme may be configured to be a logical extension of prior art MAP allocation schemes. As a third alternative, the present invention may use a completely different or completely incompatible MAP allocation scheme.

As previously discussed, in some embodiments of the invention, a combination of techniques may be combined to produce a flexible system that can be dynamically reconfigured on demand to transmit a large number of bits of data both upstream and downstream to those particular neighborhood households that presently are most in need of high capacity data transmission. In particular, this flexibility and dynamic reconfiguration may be accomplished by Time Division Duplex data transmission schemes that dynamically allocates time slots to those household modems most in need of upstream or downstream data, with a key difference from prior art being that the same frequency range (e.g. a hypothetical 100 MHz region of spectrum between 900 MHz and 1 GHz) may be utilized for both upstream and downstream transmissions.

As previously discussed, generally for TDD transmissions, one or more different types of guard times are used between the different devices that are exchanging data using TDD. These guard times (essentially silent periods when no data transmission is expected) help prevent interference that can occur when two different devices attempt to transmit data at the same time. Although critical to avoid interference and potential chaos, such guard times reduce the amount of time that data can be transmitted. As will be discussed, by utilizing some novel master modem—slave modem clock synchronization schemes, and by utilizing some sophisticated propagation time delay ranging estimation methods, these "necessary evil" guard times may be minimized, thus generating more time for productive upstream and downstream communications.

Figure 2:
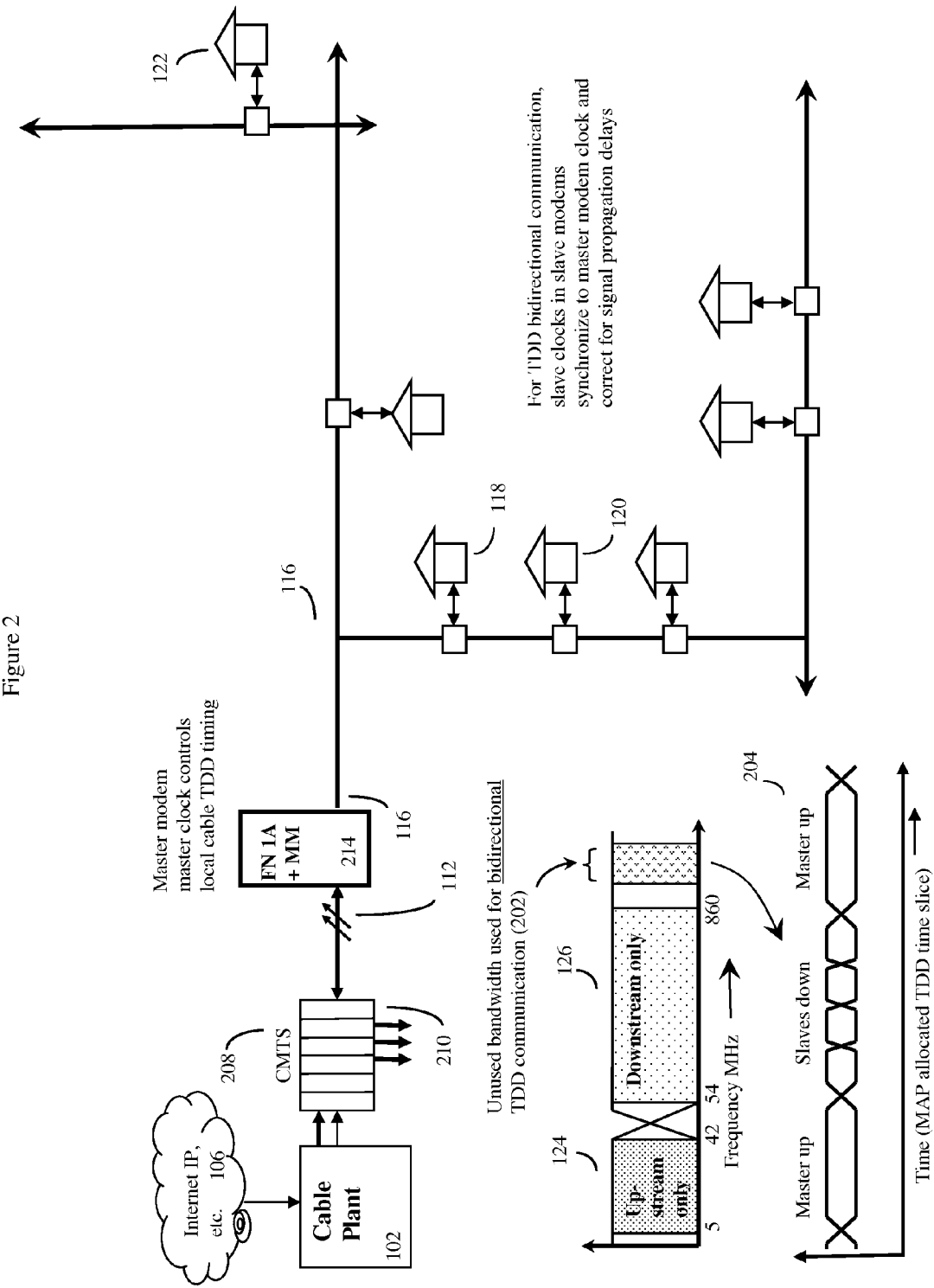
FIG. 2 shows an overview of the invention's bidirectional TDD data transmission scheme, in which upstream and downstream data is exchanged over the same frequency range of a CATV cable system.

FIG. 2 shows one example of the frequency spectrum ranges and Time Division Duplex time allocation schemes contemplated by the invention. Although in principle any CATV frequency range may be used by the invention's same-frequency TDD schemes, to preserve backward compatibility with legacy equipment, it may be convenient to utilize presently unallocated frequency ranges, such as the 900 MHz to 1 GHz frequency ranges (202) or other frequency ranges.

In the example shown in FIG. 2, such a CATV cable system may comprise a CATV cable tree (116) with a local master modem (214) (which may optionally also function at or near an optical fiber node (114)) configured with a master clock, and a plurality of slave modems (e.g. the modems in households (118, 120, 122, and so on). These slave modems are connected to various locations along CATV cable tree (116). In this example, the bandwidth allocated for bidirectional (e.g. both upstream and downstream) communications has been assigned to preserve backward compatibility with legacy systems. Thus the legacy CATV upstream frequencies (124) and downstream frequencies (126) have been preserved, and the bidirectional TDD frequency is in a different and higher frequency range (202).

Each slave modem will generally be configured with its own slave clock. Again, note that in this scheme, there will generally be a nearest slave modem, here the slave modem in household (118) is closest to master modem (214), and there will generally be a farthest slave modem. Here the slave modem in household (122) will be considered to be the farthest slave modem.

According to the invention, the at least the slave clocks controlling the TDD functionality onboard the various slave modems are generally time-synchronized to the local master modem (214) that is located closest to those particular slave modems. Note that to preserve backward compatibility, the various slave modems may also have other clocks that may, for example, be synchronized to other parts of the system, such as the CMTS (208) or cable plant (102), but here these other slave "legacy" clocks will not be discussed further. Rather all discussion of slave clocks should be considered to be those slave clocks that control same frequency TDD communications with local master modems.

Although, as previously discussed, in some embodiments, this local master modem may be located at or near an optical fiber node (214), this is an optional embodiment. In other embodiments, the local master modem may be even closer to the various slave modems, and may for example be a Coax Fiber Terminal master modem, as will be discussed in more detail later in FIG. 8.

According to the invention, the various slave clocks of the various local slave modems are time-synchronized to the master clock of the local master modem. This may be done by, for example, having the master modem transmit a synchronization tone or synchronization data sequence (e.g. a Barker or other type of synchronization code) at particular intervals, often many times per second (e.g. at 8 KHz intervals), so that the various slave clocks will have a minimal opportunity to drift between time synchronization intervals. Although prior art guard times had to be made longer due in part to differences in time synchronization between the different clocks on the different communicating devices, due to the invention's extremely tight time synchronization, these guard times can be considerably reduced.

As previously discussed, another factor that contributed to suboptimal guard times in prior art schemes was the time delays due to the time differences in signal propagation between the different devices. Even though RF signals propagate along CATV cable at or near the speed of light, given the extremely fast switching rate of modern digital communications, such speed of light signal propagation times are significant. The present invention solves this problem in two ways. First, by determining the signal propagation times between the master modem (214) and the each of the plurality of slave modems (e.g. the slave modems residing in households 118, 120, 122, and so on), this signal propagation time may be used to, for example, coordinate the upstream time slots for the various slave modems so that the various upstream signals arrive at the master modem (116) at precisely the right time slot. Second, when used in the shadow fiber and coax fiber terminal embodiment that will be discussed in FIGS. 7 and 8, the invention also solves a major part of these signal propagation delays by simply moving the local master modem much closer to the various satellite modems than had been done by prior art, thus reducing guard times to a de-minimis level, and increasing the rate of data transmission due to further guard time minimization.

In this specification, the term "de-minimus" guard time means a guard time that has been minimized by the steps of synchronizing local slave clocks to their nearest local master modem, determining the signal propagation times between the various local slave clocks and their nearest local master modem, and using this signal propagation time to adjust the transmission time of at least the upstream data packets or bursts from the various local slave modems arrive at the master modem at a time that is independent of the distance or propagation time between that particular local master modem and that particular local slave modem.

As previously discussed, the invention may further optimize transmission efficiency by determining the current or projected upstream and downstream data needs for each of said plurality of slave modems, and allocating time slots that are dynamically (e.g. with high frequency, up to many times per second) adjusted to assign more time slots to those modems most in need of data transmission capability at any given time. Indeed, the invention may combine all of these factors and use both the signal propagation times and the current or projected upstream and downstream data needs for each of the plurality of slave modems to continually and dynamically construct MAP Time Division Duplex allocation schemes optimized for the system's data transmission needs at that particular moment. For example, the local master modem may take these factors into account, and up to many times per second transmit an optimized MAP Time Division Duplex allocation scheme (204) to each of the various local slave modems. Thus each slave modem, for example, may receive time slots that are adjusted both in amount and potentially also time duration for that slave modem's particular needs (somewhat balanced by overall system demands and the needs of other slave modems). The time slots may also be adjusted for the signal propagation delays between the local slave modem and the local master modem. This scheme, in conjunction with the invention's precise time synchronization methods, can also minimize guard times and optimize the amount of time that can be devoted to actual data transmission.

Figure 3:
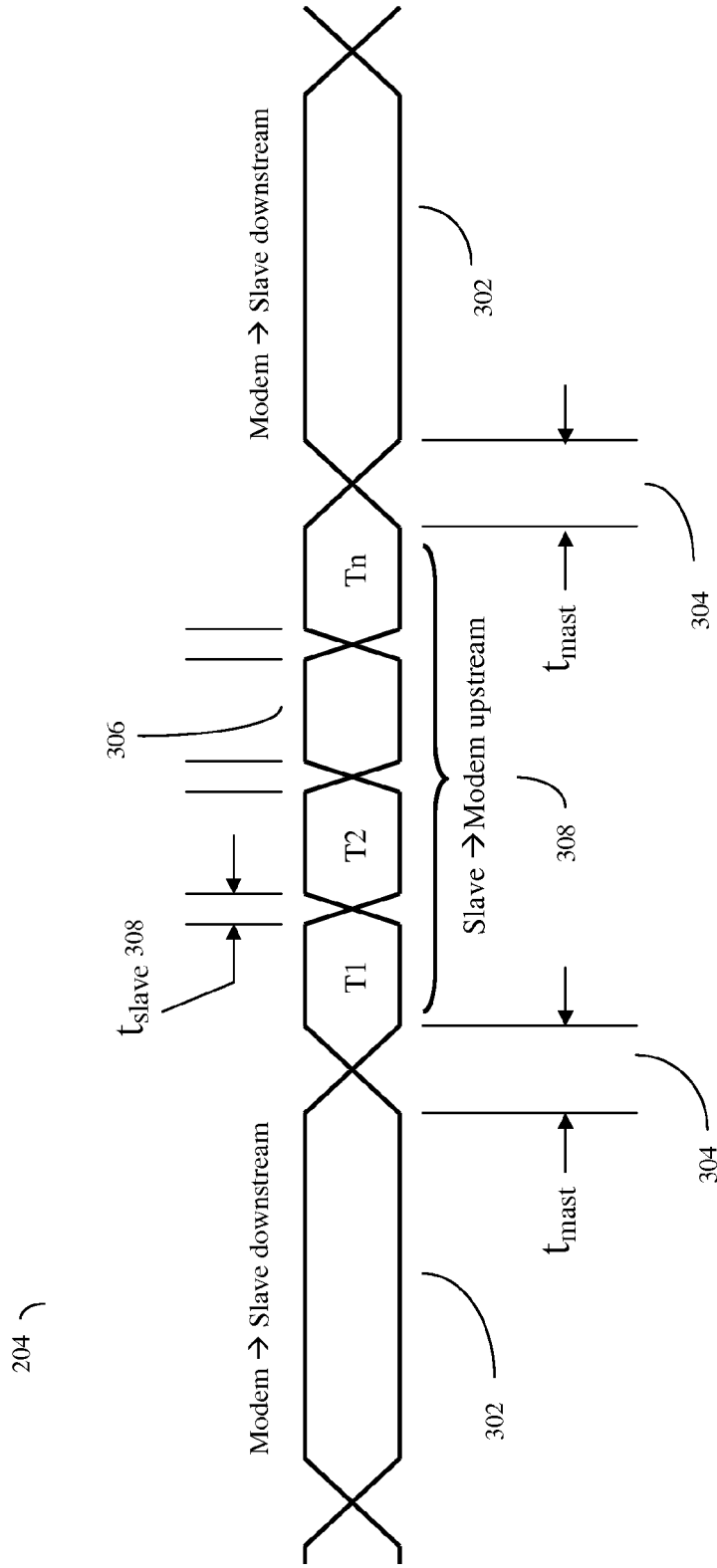
FIG. 3 shows a more detailed example of the various times allocated to the master modem and slave modems for same frequency upstream and downstream communications, along with the associated guard times between these upstream and downstream communications intervals.

FIG. 3 shows a more detailed example of the invention's master modem MAP time synchronized Time Division Duplex Transmission scheme, previously shown in FIG. 2 (204).

Here one MAP time slice may be allocated for upstream transmission from the master modem to one or more slave modems (302). A first guard time $t_{master}$ (304) (abbreviated as $t_{mast}$) may then follow. The $t_{master}$ time may itself be highly time optimized, but at least in some embodiments, $t_{master}$ may be limited by the overall signal propagation times along at least the stretch of CATV cable occupied by the local master modem and the various satellite modems controlled by that local master modem. For example, $t_{master}$ may be set to be at least twice the signal propagation time between the local master modem and the furthest local slave modem on that length of CATV cable. This way signals from the master modem will have had time to reach the furthest modem, and any signal back from the furthest master modem will have had time to reach the master modem, before any slave modems are allocated time slots to transmit upstream.

The various time slots allocated by the MAP time slices to the various slave modems are shown in (306). For example, time T1 may be allocated to slave modem 1, T2 may be allocated to slave modem 2, and so on. Under the invention's dynamic allocation schemes, the lengths of T1, T2 . . . Tn need not be identical. Further, multiple time slots may be allocated to the same slave modem in a single upstream transmission sequence, and not all slave modems need be allocated an upstream time slot during any given upstream transmission sequence. Rather, those slave modems that have more need to transmit upstream data may be allocated more time slots or longer time slots at the expense of slave modems that have a lesser need to transmit upstream data at that particular time.

Although the time slots allocated to the various slave modems for upstream transmission (306) will themselves generally be separated by different guard time $t_{slave}$, by using the invention's precise modem time-synchronization techniques, and signal propagation time adjustment techniques, as previously discussed, this $t_{slave}$ guard time may be made de-minimis (extremely small). This is because inaccuracies due to clock differences between slaves can be minimized, and inaccuracies due to differences in signal propagation times from any give slave to the master can be precisely compensated for. Thus $t_{slave}$ may need to be no longer than the time needed to compensate for minor variations in the time for the different slave electronic components to process data, temperature fluctuations, and the like, and indeed may be only the time allocated for a single transmission symbol or even fraction of a transmission symbol. Often the MAP timing will be such as to allocate upstream transmission time for a plurality of slave modems as part of a series of upstream data bursts (308).

The overall time that the system may allocate for a continuous series of upstream transmissions from multiple slave modems (308) may vary, but generally will be no shorter than the differences in time propagation in signals between the nearest slave modem to the master modem, and the furthest slave modem to the master modem. Here this difference in signal propagation time, T(furthest)−T(nearest) will be termed the signal "spread" time.

Put another way, the spread time is the difference in the signal propagation times between a master modem (214) and its nearest slave modem (118); and a master modem (214) and its furthest slave modem (122). In some embodiments, the MAP Time Division Duplex allocation scheme may dynamically allocate various upstream time slots to the plurality of slave modems on a contiguous block of upstream time slots basis (i.e. a number of slave modems are assigned to transmit upstream as a contiguous block, similar to FIG. 3 (308)). In this type of allocation scheme, then the upstream-to-downstream guard time $t_{master}$ (here abbreviated as $t_{mast}$) (304) between the end of the block of upstream time slots (308) and the beginning of the MAP Time Division Duplex time allocated to downstream data from the master modem to the slave modems (304) may be set to at least twice the spread time.

If we designate the propagation time between the master modem (214) and its nearest slave modem (118) as a "span" time; then in general, the time that the MAP allocation scheme allocates to the contiguous block of upstream time slots (308) will generally vary according to this span time.

Figure 4:
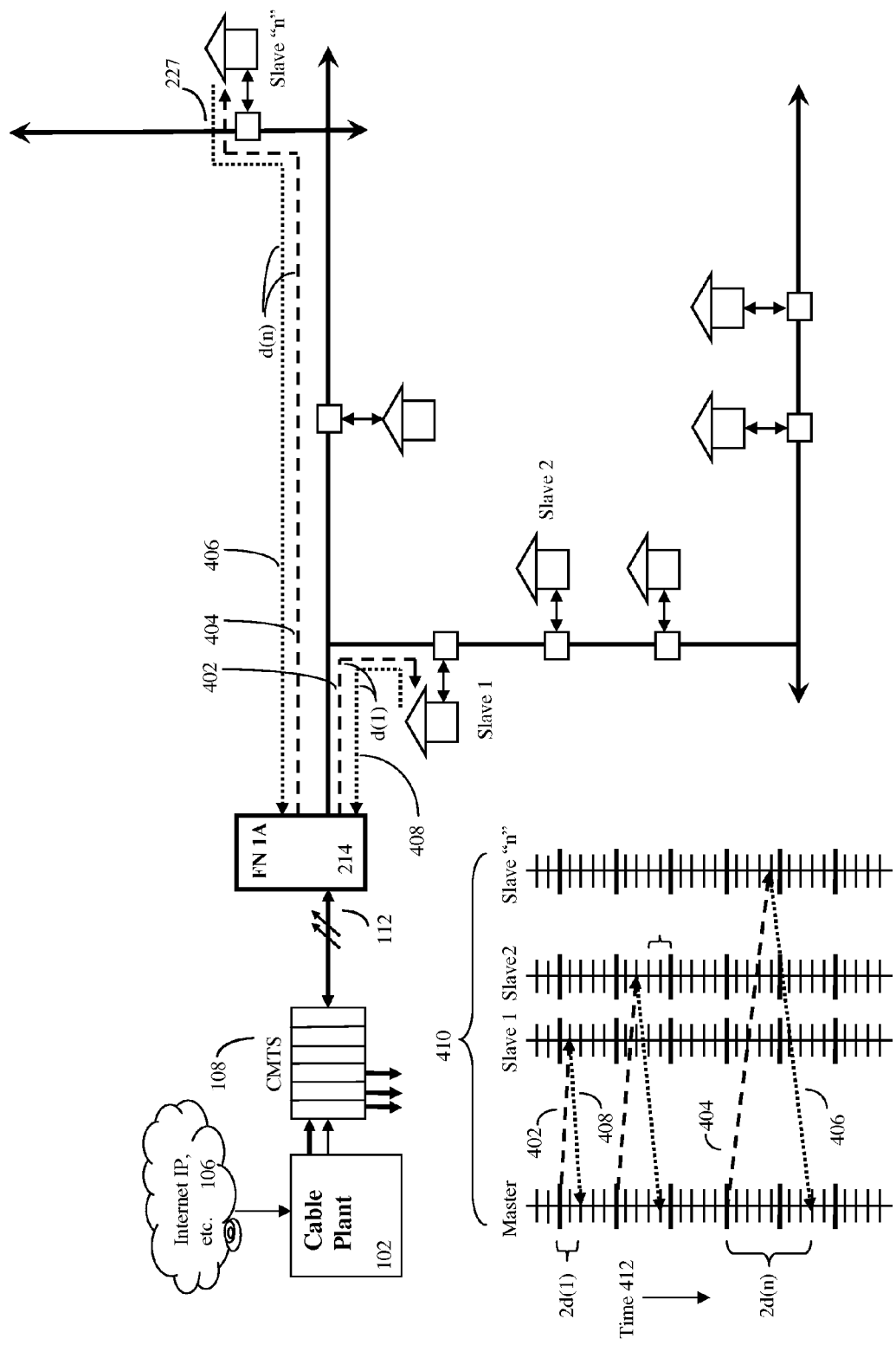
FIG. 4 shows how ranging can be used to determine the signal propagation times between the master modem and the various slave modems.

FIG. 4 shows some of the details of the ranging process in which the signal propagation delay d(n) between the master modem and the various slave modems may be determined. In this process, the master modem (214) will generally send out various local slave clock synchronization signals along the CATV cable, often in frequency range (202). These synchronization signals may be a tone or a defined digital sequence (e.g. a Barker code and the like). The signals may be sent many times a second (e.g. 8,000 times a second), and the slave clock time-synchronization signals will typically interleaved between other CATV data transmissions at this frequency (202). These clock synchronization signals (402, 404) are carried over various paths in the local CATV cable tree to their respective slave modems, such as slave 1, slave 2, and slave "n".

After the slave modem clocks have been synchronized, the signal propagation times between the various slave modems and the master modem may be determined. Although often a different "ranging" pulse or signal may be used for ranging determination, in some embodiments, the clock synchronization pulse or signal may also be used as the ranging signal.

The signal propagation time to slave 1 will be considered to be d(1), the signal propagation time to slave 2 will be considered to be d(2), and the signal propagation time to slave "n" will be considered to be d(n).

During the ranging and synchronizing process, each slave modem will generally rapidly respond with an acknowledge message (406, 408), and this will propagate back along the same path with another time delay d(1) . . . d(n) depending upon the propagation time to that particular satellite modem. In this simplified example, the additional delays due to slave modem's electronics are ignored, but generally, these electronics delay times will also be factored into the various propagation time delay equations.

These time delays are shown in chart (410). In chart (410), the time axis (412) is vertical, and the times at the master modem and slave modems slave 1, slave 2, and slave "n" are shown. Here the time at which the clock synchronization signals (402, 404) are sent out from the master modem, and the times in which the slave modem acknowledge messages are received (408, 406) are shown. As can be seen, the total elapsed time (neglecting electronics delays internal to the various slave modems) will be twice the one way signal propagation time d(1) . . . d(n) from the master modem to that particular slave modem.

As previously discussed, once the signal propagation delay time is determined, the various slave modems can use this delay time to further adjust the times in which they transmit data back to the master modem, as well as optionally to better adjust the times in which they are listening for data from the master modem.

Note that in some embodiments, the ranging and also the clock synchronization process may be done incrementally. Here for example, one sub-channel can begin the coarse ranging process, and with time, ranging and synchronization can then gradually proceed to cover the entire band. This incremental ranging and or synchronization process can minimize the impact of the guard time ambiguity that is required in the initial ranging process. Ideally this minimized guard time now can consume only a small portion of the available band/capacity.

Figure 5:
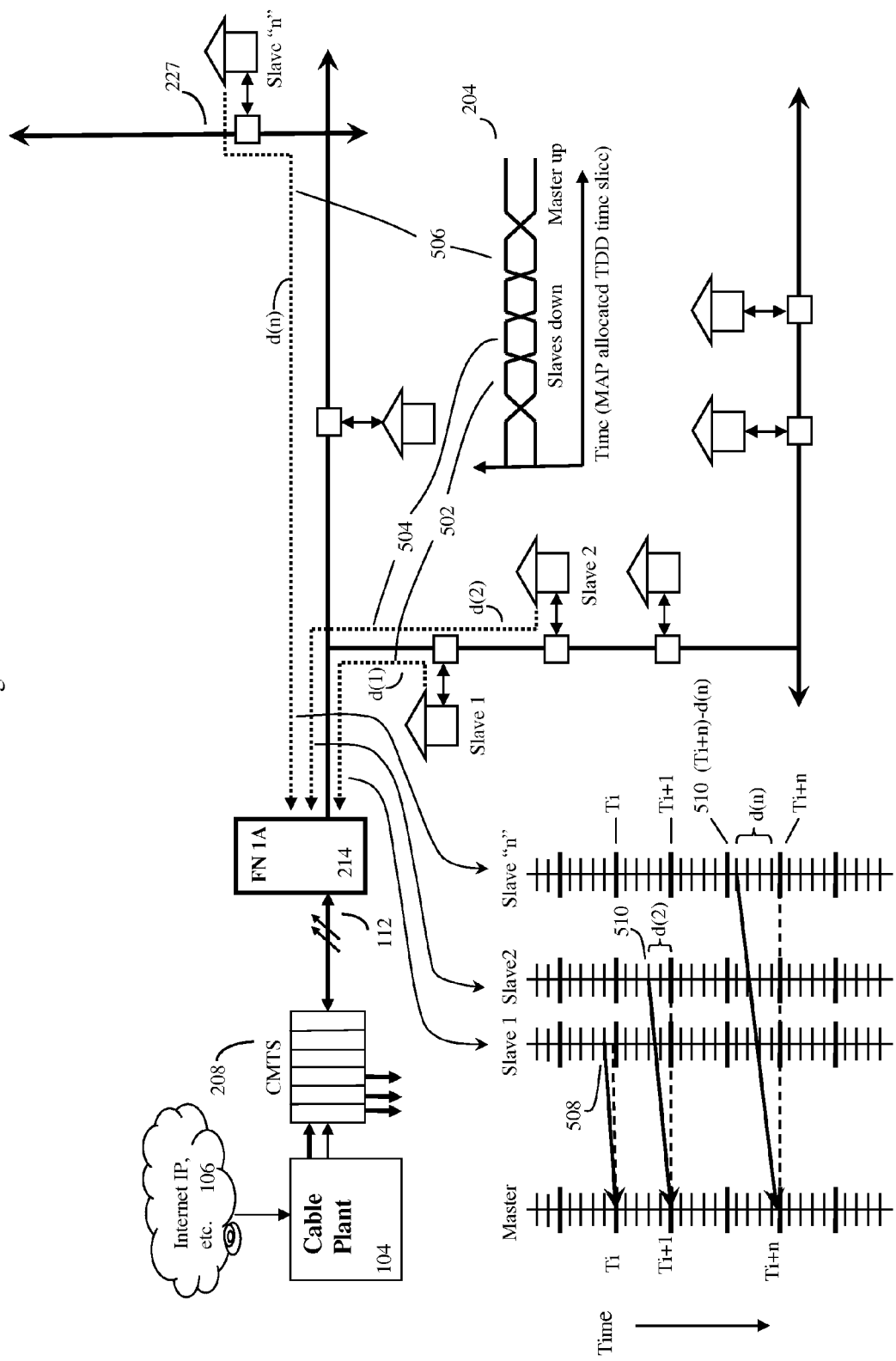
FIG. 5 shows an example of how the various slave modems can incorporate their respective signal propagation times to adjust their respective upstream transmission times, thus ensuring that the upstream data arrives at the master modem at precisely the correct time. This allows for minimum (de-minimis) guard times between the various slave modem upstream transmissions.

FIG. 5 shows an example of some of the time delay considerations involved in ranging and scheduling. Here the various slave clocks (Slave 1, Slave 2 . . . Slave "n") can use the signal propagation delay time d(1), d(2), . . . d(n) to adjust their respective upstream transmission time slots so that the transmissions from each slave modem reach the master modem in the proper time slot that is expected by the master modem, with very small (de-minimis) guard times $t_{slave}$ (308) in between the various slave modem upstream transmission time slots (306).

For example, assume that slave 1 has been MAP assigned to transmit upstream with data assigned to arrive at the master modem (214) in time slot $T_i$ (502), slave 2 has been MAP assigned to transmit upstream with data intended to arrive at the master modem (214) in time slot $T_{i+1}$ (504), and slave "n" has been MAP assigned to transmit upstream with data intended to arrive at the master modem (214) in time slot $T_{i+n}$ (506). Then to compensate for signal propagation delays along the CATV cable, slave modem 1 should actually commence transmission at time $T_{i-d(1)}$ (508), slave modem 2 should actually commence transmission at time $T_{i+1-d(2)}$ (510), and slave "n" should actually commence transmission at time $T_{i+n-d(n)}$ (512).

How is the MAP Time Division Duplex scheme, used to generate the time slots in FIG. 3 (204) to determine which upstream time slots are reserved for which slave modem? How is the MAP scheme to determine the relative length of the master modem to slave downstream time slots? Here a number of schemes are possible. In one scheme, the upstream modems (e.g. 118, 120, 122) may determine their local upstream data requirements, and send requests to the master modem (214) designating the amount of downstream data required to transmit, and how urgent this data is (live video, for example, may have higher urgency than a text file transmission). The master modem (216) in turn will weigh and balance these various requests (usually by using MAP creation software that will run under one or more processors on master modem 216), and determine a MAP allocation scheme according to one or more algorithms. This weighing and balancing may preferably change as the data needs of the various slave modems change. Thus the MAP Time Division Duplex scheme will dynamically allocate slots for upstream transmission on the basis of upstream data requests by each of its various slave modems.

Figure 6:
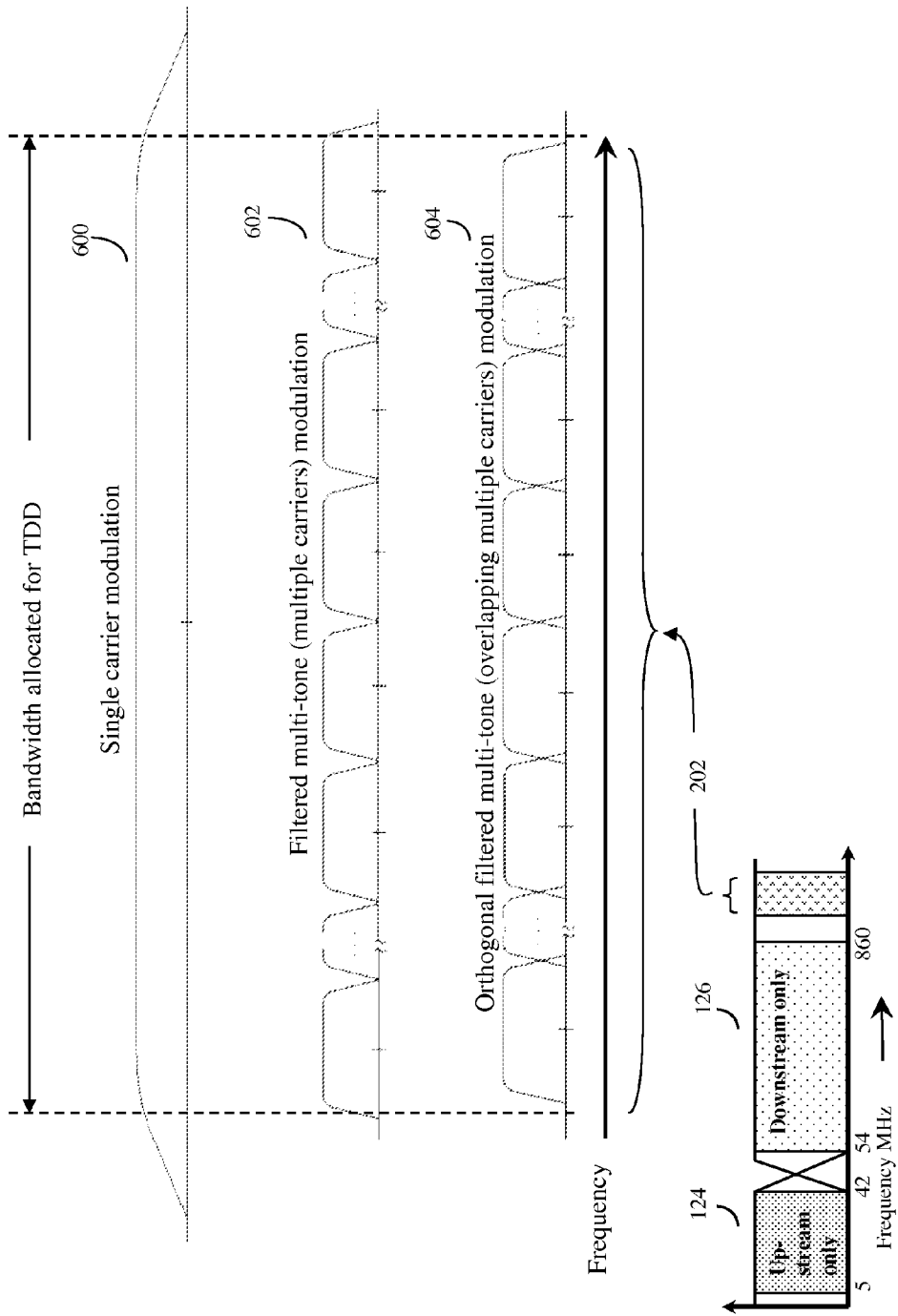
FIG. 6 shows that in some embodiments, the frequency range assigned for bidirectional TDD communications may be further subdivided into multiple frequency ranges. Here various schemes may be used.

FIG. 6 shows some of the alternate spectrum allocation schemes that can be used by the invention's Time Division Duplex method. In some single carrier schemes, any given modem may utilize all of the bandwidth (600) (FIG. 2 (202)) allocated for TDD transmissions; however the signal spreading around the center frequency induced by high data transmission rates may either cause the signal to spread beyond the allocated bandwidth, or alternatively force the operator to use substantially less than the full allocated TDD bandwidth (202). This spreading problem can be reduced by instead spreading the data over multiple carriers using filtered multi-tone modulation (602). The spreading problem can be reduced still further by using orthogonal filtered multi-tone modulation, with some overlapping between the multiple carriers (604).

Note that although at first glance, FIG. 6 might be misinterpreted as teaching prior art Time Frequency Division schemes in which upstream transmission was done at a different frequency than downstream transmissions, this is not the case. Rather, FIG. 6 teaches a Time Division Duplex scheme in which both upstream and downstream transmissions will still generally take place at the same frequency, but this same frequency may in fact be multiple same frequencies.

Still other time-frequency allocation schemes, such as CDMA-like spread-spectrum schemes, are also possible, and in alternate embodiments of the invention, a time—CDMA scheme may be employed.

In addition to reducing bandwidth spreading, the multiple frequency or multi-tone TDD schemes have a number of other advantages as well. One advantage is the ability for multiple tone TDD schemes can have a superior ability to cope with various types of impaired RF transmission along the CATV cable tree (116).

For example, one such type of "channel impairment" is the previously discussed fact that the amount of RF signal attenuation per foot along CATV cable is greater at high frequencies than it is at low frequencies. In practice, this type of impairment is often corrected for by use of amplifiers and by boosting the power of the more remote modems, but since this is a simple and easy to understand impairment, for this example assume that such variable power or gain compensation schemes have not been implemented, and instead this impairment is going to be addressed by a suitable MAP allocation scheme.

Figure 7:
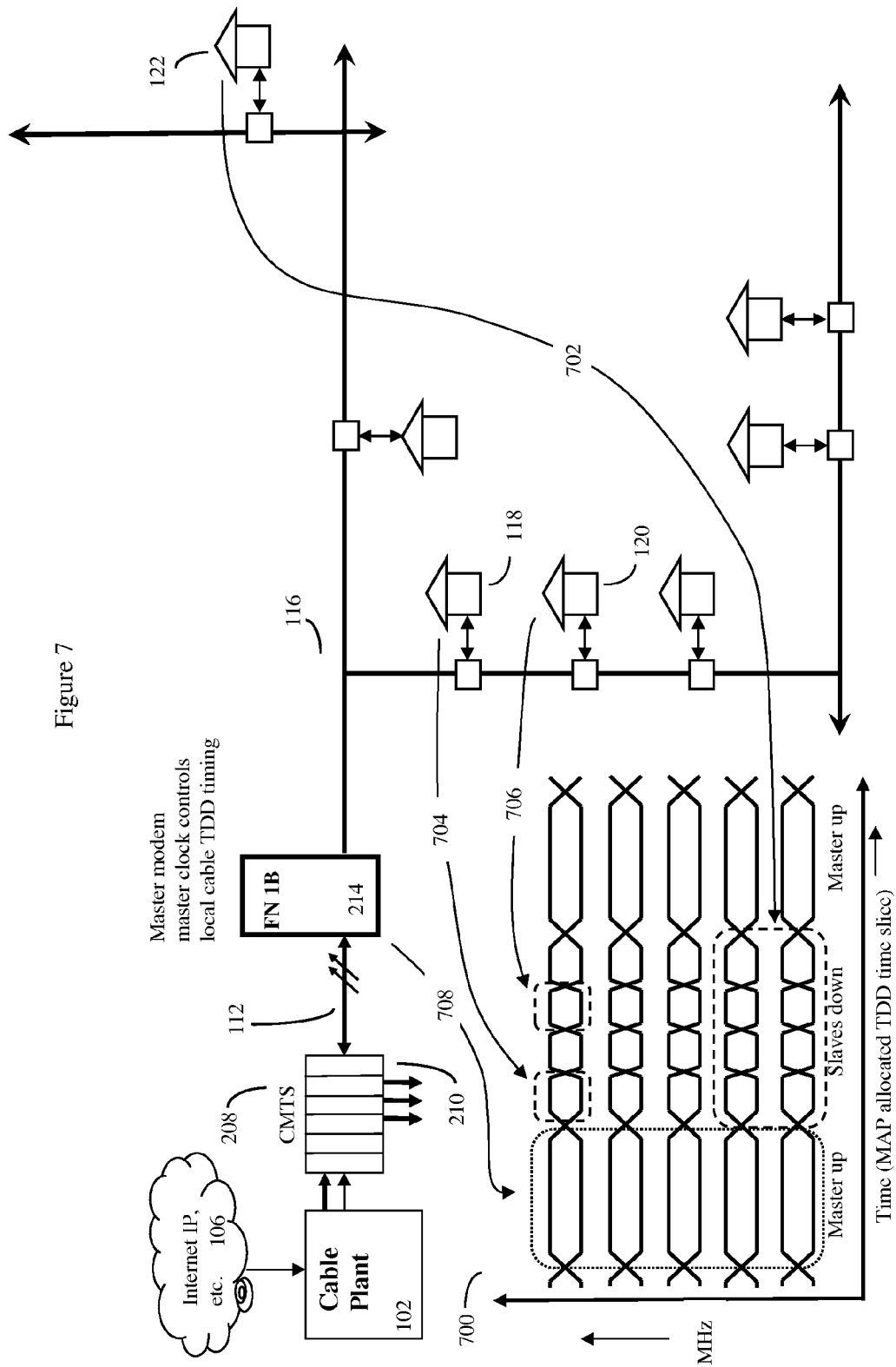
FIG. 7 shows how the invention's multi-frequency TDD MAP allocation scheme can help a CATV system cope with various communications pathway (e.g. CATV RF cable) impairments.

An example of the utility of such a multi-frequency or multi-tone TDD map allocation scheme to correct for channel impairments, such as high frequency attenuation, is shown in FIG. 7. In FIG. 7, assume that the furthest slave modem (122) suffers from somewhat too much signal attenuation at the highest frequencies (e.g. 1 GHz). As a result, due to this high frequency attenuation scheme, the full spectrum TDD packets sent by slave modem (122) may have a somewhat higher than desired error rate, causing the local master modem's error detection mechanisms to request too many data packets to be re-transmitted, resulting in an undesired loss in efficiency. Assume further that at somewhat lower frequencies (e.g. 900 to 950 MHz), the attenuation is enough less that use of lower frequencies for slave modem (122) is preferred. By contrast, nearest slave modem (118), which is much closer to the master modem, does not have a significant attenuation problem, and can easily operate at the highest assigned frequency range, such as 1 GHz without generating errors. Assume further that the intermediate distance slave modems, such as slave modem (120), can operate adequately in all frequency ranges.

In a multi-frequency (e.g. multi-tone) TDD scheme, the MAP allocation scheme may be a two dimensional time and frequency allocation scheme (700), in which more distant slave modems such as (122) are preferentially allocated lower frequencies, and closer slave modems such as (118) are preferentially allocated higher frequencies, but this can dynamically change according to the system's needs at any given time. For example, if slave modem (122) needed to send a massive amount of data and no other slave modem needed to send any data at all, all time slots and all frequencies might temporarily be allocated to slave modem (122). By contrast, for two modems located more closely together, such as (118), (120), the frequency assignment might be unimportant, and the system would simply pick open frequencies and time slots on an as available basis, so that often the two might transmit on the same frequency but in different time slots.

In general, often it will be useful for both this and other channel impairment correction schemes if the master modem and slave modems routinely (i.e. with some frequency, often at least many times a day) exchange information pertaining to the various path distortions or signal strength loss between the various modems.

FIG. 7 shows a situation where the more distant slave modem (122) needs to upload and download a substantial amount of data, and the nearer slave modems (118), (120) have relatively light data needs. The other modems will be ignored in this example. Here, in order to meet these needs, the MAP allocation scheme algorithm may determine that to meet the substantial data demands of the distant slave modem (122), multiple low frequency upstream time slots (702) should be assigned to the distant slave modem (122). By contrast, the nearer slave modems (118) and (120) have moderate upstream data needs, and since they have minimal signal loss at high frequencies, they are assigned the same high frequency at two different upstream time slots (704), (706).

Thus in some embodiments of the invention, the MAP Time Division Duplex allocation scheme may dynamically allocate slots for upstream transmission by the various slave modems on a time and frequency basis. Here, at least for the duration of one consecutive series of upstream time slots (308), each of those slave modems may be assigned a unique combination of time and frequency.

Note that this scheme remains a Time Division Duplex scheme, even when, for a brief period of time, each slave modem (e.g. 118, 120, 122, etc.) might due to random circumstances be temporarily assigned to a different upstream frequency. This is because the master modem (214) may continue to use (708) the same frequencies or all frequencies of the assigned TDD frequency range (202) for downstream communications to the various slave modems.

In this sort of scheme, typically either the master modem (214), the slave modems (118.122), or both may typically act to determine such communications path distortions or signal loss along its respective CATV cable tree path (116) to the master modem (214), and communicate these findings to the master modem, so that the master modem's MAP creation algorithms may take these effects into consideration when generating MAP time and frequency allocation schemes.

Other schemes to account for signal attenuation, distortion, noise or other impairments along the CATV cable tree path can also be done. In alternative embodiments, the slave modems may be designed with the capability to modulate the power of their transmitted signals according to the signal strength path loss on their CATV cable tree path to the master modem. In other alternative embodiments, the nature of signal distortions along the CATV cable tree path to the master modem may be assessed, and the slave modems may adjust their transmitted signal to compensate for these distortions or cancel out these distortions.

This compensation process is often referred to as "precoding". Thus in some embodiments, any of the slave modems may precode their transmissions to compensate for path distortions on their respective CATV cable tree path to the master modem.

As previously discussed, although the present invention may often be implemented on, with, or as part of enhanced optical fiber nodes (114) that lie at the root of the RF portion of neighborhood CATV cable trees (116), other embodiments are possible. In particular, the invention is well suited to be implemented in the shadow fiber and coax fiber terminal schemes of parent and copending application Ser. No. 12/907, 970, the contents of which are incorporated herein by reference.

Figure 8:
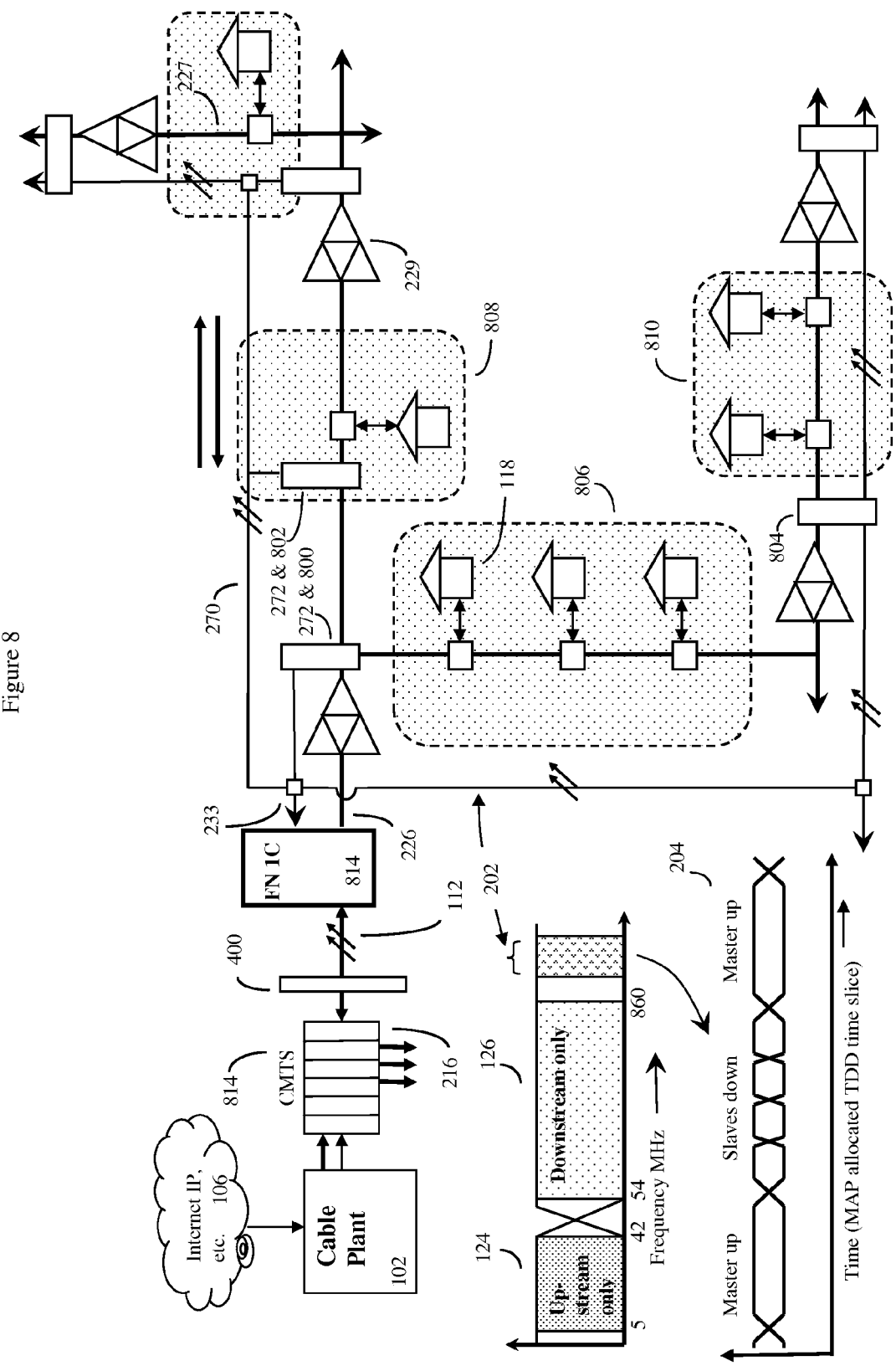
FIG. 8 shows an alternate embodiment of the invention in which the master modem (which now becomes a plurality of local master modems) is incorporated into Coax Fiber Terminal devices, and pushed closer to the various neighborhood households using the shadow fiber concepts previously discussed in copending application Ser. No. 12/907,970.

FIG. 8 shows an alternate embodiment of the invention in which the master modem (which now becomes a plurality of master modems) is pushed closer to the various neighborhood households using the shadow fiber concepts previously discussed in copending application Ser. No. 12/907,970. Note that in FIG. 8, the optical fiber node (814) (formerly 114, but distinguished because of potential different functionality) may not be a master modem. Rather, there are now a plurality of local master modems, e.g. (800), (802), (804) and so on.

In some embodiments, the optical node (814) can, at least in part, be based on CMRTS or D-CMRTS optical nodes as described in copending application Ser. Nos. 12/692,582 and/ or provisional application 61/385,125; the contents of both are incorporated herein by reference.

FIG. 8 shows how "shadow optical fiber" (270) can generally be routed along the same easements, paths and conduits used to carry the neighborhood CATV cable tree (here broken down into trunk sections (226) and branch sections (227). This shadow optical fiber can in turn interact with Coax Fiber Terminals (CFT) (272) which are devices, usually positioned on, in, or near the CATV active devices (e.g. RF amplifiers 229), that can remove some or all of the upstream RF signals traveling back from the various households (118) along the particular CATV branch cable (227) or trunk cable (226) serviced by that particular active device (229). The Coax Fiber Terminals (272) can then transform the upstream CATV RF signals and data into upstream optical signals and data, and this can be carried back to the cable head, often by way of modified optical nodes (814) via the HFC system.

Note in this embodiment, although the lower frequency legacy CATV RF signals (124) and (126) may travel throughout the CATV cable tree (226), (227), the high frequency signals (202) used for the invention's TDD transmission scheme will often generally be more localized to particular sections of the CATV cable. This is because the active devices (229) or other devices may be designed to prevent the high frequency band (202) from traveling between one side of the device (229) to the other side of the device, thus effectively isolating transmission of frequency bands (202) to various sub-portions (806), (808), (810) or domains of the CATV cable.

In the present invention, the coax fiber terminals (800, 802, 804) act as a plurality of local master modems, and these local master modems only communicate with a subset of the total number of slave modems on the entire CATV tree (226) and (227). Thus local master modem (800) TDD communicates with local slave modems in domain (806), local master modem (804) communicates with local slave modems in domain (810), and so on.

Again, as previously discussed, this locality and these domains exist because the various active components (229) or other components can be designed to prevent the TDD frequency or bandwidth (202) from passing past that particular active (229). Thus the active components (229) effectively partition the entire CATV tree into a series of smaller TDD domains.

According to the invention, prior art optical nodes may be used for (814), and additional devices may be added to intercept upstream data from the shadow optical fiber network (270) and repackage this for transmission back to the cable head, often along optical fiber route (112), often using alternate fibers or alternate wavelengths. Alternatively, the optical node may be modified into a modified optical node (814) with additional components to handle this repackaging internally.

In some embodiments, at the cable head, often just before the CMTS (814) (previously described in Ser. No. 12/907, 970) a decoder apparatus (400) may intercept the optical fiber signals (112) and decode them into a form that can then be recognized by the CMTS. For example, such decoding may be used interpret the shadow fiber Cable Fiber Terminal (CFT) domain (e.g. 806, 808, (810) information into a form that the CMTS can process, and may, for example, make each different Cable Fiber Terminal domain appear to the CMTS as if it is a separate CATV neighborhood. The decoder apparatus may also, in some embodiments, reconstitute upstream data signals coming from the Cable Fiber Terminals.

In this scheme, some or all of the TDD communications are now carried over the shadow optical fiber (270). By contrast, at least the downstream CATV data (126) and optionally the legacy upstream CATV data (124) may be carried over the main RF CATV cables (226) and (227) without limitation as to specific domains.

Here, use of such shadow optical fiber systems and Coax Fiber Terminals methods are very compatible with the present invention because, as previously discussed; the high (near 1 GHz) frequency range is attenuated rapidly as a function of distance in CATV coaxial (coax) cables. When Coax Fiber Terminals are used, the communications between the local master modems (800, 802, 804), which are now configured as Coax Fiber Terminals (272) are facilitated because the path length between the local master modem and the local slave modems are now much less. At the same time, much of the legacy CATV cable hardware can be preserved and can continue to be productively utilized.

Assuming that the shadow optical fiber network is a passive optical network, then simple beam splitters can be used (233) to split and combine the various passive optical fibers. This helps lower the cost of the shadow optical fiber network, and allows the capabilities of the shadow optical fiber network to be gradually improved over time by swapping in (and out) more and more capable CFT devices—e.g. on the system may be gradually upgraded "dumb" CFT devices to smarter upstream repackaging CFT devices to the invention's TDD local master modem devices (capable of delivering gigabyte to the home or GTTH service), all without requiring many changes to the basic local shadow optical fiber network itself.

Thus FIG. 8 shows how in the alternate, shadow fiber, version of the invention, a neighborhood CATV system might be covered by multiple master modems (800, 802, 804), each addressing slave modems that are in different domains of the neighborhood CATV cable tree path.

Here, for example, a first combination Cable Fiber Modem and local master modem (800) addresses (engages in TDD communication over frequency (202) the local slave modems only in domain (806). A second combination Cable Fiber Modem and local master modem (804) addresses the local slave modems in domain (810), a third combination Cable Fiber modem and local master modem (802) addresses the local slave modems in domain (808), and so on.

Alternatively, the combination of the Cable Fiber Modem and the local master modem can have reduced functionality. For example, the local master modems (800), (802), (804) may act more as high level slaves or executive slaves to a root Master Modem (814), and only perform a subset of the time synchronization and ranging (signal propagation time determination) steps performed by the root Master Modem (814). As yet another alternative, the local master modems (800), (802), (804) may also act in pass-through mode for downstream operation, and only operate for the upstream portion of the transmission.

As yet another embodiment, the Cable Fiber Modems (800), (802), (804) can have only the functionality previously discussed in U.S. patent application Ser. No. 12/907,970 (incorporated herein by reference). In this embodiment, the root Master Modem (814) will continue to handle some or all of the time-synchronization and ranging functions.

As yet another embodiment, time synchronization and ranging can occur both between the root Master Modem (814), the local master modems (800), (802), (804), and the various household modems, thus generating a three-way time synchronization and ranging process. This three way process is time synchronization and ranging between: root master modem to the local master modems, and the local master modems to the local household modems; and/or the root master modem to the local master modems, and the root master modem to the local slave modems. Essentially all permutations of time synchronization and ranging may be used in this embodiment.

Alternate Embodiments

In an alternate embodiment, the system can also be used to generate legacy DOCSIS upstream signals, and receive legacy DOCSIS downstream signals.

The invention claimed is:

1. A method of bidirectional Time Division Duplex data transmission over the same frequency ranges of a CATV cable system:
    said CATV cable system comprising: a CATV cable tree with a root master modem configured with a master clock, and a plurality of slave modems connected to various locations of said CATV cable tree, each said slave modem configured with a slave clock, said plurality of slave modems being disposed at various distances along said CATV cable tree from said root master modem;
    said plurality of slave modems comprising at least a nearest slave modem disposed along the shortest CATV cable tree path from said master modem, and a furthest slave modem disposed along the longest CATV cable tree path from said master modem;
    said method comprising:
    time synchronizing the slave clocks of said plurality of slave modems to the master clock of said master modem;
    determining the signal propagation times between said master modem and each of said plurality of slave modems;
    determining the current or projected upstream and downstream data needs for each of said plurality of slave modems;
    using said signal propagation times and said current or projected upstream and downstream data needs for each of said plurality of slave modems to construct a MAP Time Division Duplex allocation scheme, and transmitting said MAP Time Division Duplex allocation scheme to each of said plurality of slave modems;
    and using said MAP Time Division Duplex allocation scheme to control the bi-directional data transmission between said master modem and said plurality of slave modems.

2. The method of claim 1, in which each slave modem is allocated upstream time slots by said MAP Time Division Duplex allocation scheme, and the guard time between different upstream time slots is a de-minimis guard time.

3. The method of claim 1, in which the difference in the signal propagation times between said master modem and said nearest slave modem, and said master modem and said furthest slave modem, is a spread time;
    said MAP Time Division Duplex allocation scheme dynamically allocates upstream time slots to said plurality of slave modems on a block of upstream time slots basis;
    and the upstream-to-downstream guard time between the end of said block of upstream time slots and the beginning of the MAP Time Division Duplex time allocated to downstream data from the master modem to the slave modems is at least twice the spread time.

4. The method of claim 3, in which the propagation time between the master modem and said nearest slave modem is a span time; and
    the time allocated to said block of upstream time slots varies according to said span time.

5. The method of claim 1, in which said MAP Time Division Duplex allocation scheme dynamically allocates slots for upstream transmission by the plurality of slave modems on a time and frequency basis; and each of those slave modems assigned time to transmit by said allocation scheme are assigned a unique combination of time and frequency.

6. The method of claim 5, in which said frequency is a plurality of frequencies, and said frequencies are modulated with data in a manner so that the spectral spread induced in said frequencies due to data modulation is such as to avoid overlap between said frequencies.

7. The method of claim 5, in which said frequencies is a plurality of orthogonally modulated frequencies, and said frequencies are modulated with data in a manner so that the spectral spread induced in said frequencies due to data modulation results in some overlap between said frequencies, but said overlap may be compensated for due to the orthogonal nature of the frequency modulation.

8. The method of claim 1, in which said MAP Time Division Duplex scheme dynamically allocates slots for upstream transmission on the basis of upstream data requests by each of said plurality of slave modems.

9. The method of claim 1, in which any of said master mode or said slave modems determines either path distortions or signal strength loss on its respective CATV cable tree path between said master modem and said slave modems, and in which said master modem and said slave modems exchange information pertaining to said path distortions or signal strength loss.

10. The method of claim 9, in which any of said slave modems communicate either said path distortions or signal strength loss on its respective CATV cable path to said master modem, and said master modem uses said path distortions or signal strength loss to construct its MAP Time Division Duplex allocation scheme.

11. The method of claim 9, in which any of said master or slave modems modulate the power of its transmitted signal according to the signal strength path loss or path distortion on its CATV cable tree path between said master modem and said slave modems.

12. The method of claim 9, in which any of said master or slave modems precode its transmissions to compensate for path distortions on its respective CATV cable tree path between said master modem and said slave modems.

13. The method of claim 1, in which said master modem is a Cable Fiber Terminal device that transmits and receives at least some data using shadow optical fiber; or in which said master modem sends its signals to said slave modems through shadow optical fiber and Cable Fiber Terminal devices.

14. The method of claim 1, in which said frequency range is a frequency range above 860 MHz, and the frequency range less than 860 MHz is reserved for other modes of communication.

15. The method of claim 1, in which time synchronizing the slave clocks of said plurality of slave modems to the master clock of said master modem is done by having said master modem transmit a tone or periodic sequence to said plurality of slave modems.

16. A method of bidirectional Time Division Duplex data transmission over the same frequency ranges of a CATV cable system:
said CATV cable system comprising: a CATV cable tree with a root master modem configured with a master clock, and a plurality of slave modems connected to various locations of said CATV cable tree, each said slave modem configured with a slave clock, said plurality of slave modems being disposed at various distances along said CATV cable tree from said root master modem;
said plurality of slave modems comprising at least a nearest slave modem disposed along the shortest CATV cable tree path from said master modem, and a furthest slave modem disposed along the longest CATV cable tree path from said master modem;
said method comprising:
time synchronizing the slave clocks of said plurality of slave modems to the master clock of said master modem;
determining the signal propagation times between said master modem and each of said plurality of slave modems;
determining the current or projected upstream and downstream data needs for each of said plurality of slave modems;
using said signal propagation times and said current or projected upstream and downstream data needs for each of said plurality of slave modems to construct a MAP Time Division Duplex allocation scheme;
wherein said MAP Time Division Duplex allocation scheme dynamically allocates slots for upstream transmission by said plurality of slave modems on a time and frequency basis;
each of those slave modems assigned time to transmit by said allocation scheme are assigned a unique combination of time and frequency;
transmitting said MAP Time Division Duplex allocation scheme to each of said plurality of slave modems;
using said MAP Time Division Duplex allocation scheme to control the bi-directional data transmission between said master modem and said plurality of slave modems;
wherein bi-directional data transmission between said master modem and said plurality of slave modems contains data is encoded using one or more error correction algorithms; and
which said frequency range is a frequency range above 860 MHz, and the frequency range below 860 MHz is reserved for other modes of communication.

17. The method of claim 16, in which each slave modem is allocated upstream time slots by said MAP Time Division Duplex allocation scheme, and the guard time between different upstream time slots is a de-minimis guard time.

18. The method of claim 16, in which the difference in the signal propagation times between said master modem and said nearest slave modem, and said master modem and said furthest slave modem, is a spread time;
said MAP Time Division Duplex allocation scheme dynamically allocates upstream time slots to said plurality of slave modems on a block of upstream time slots basis;
and the upstream-to-downstream guard time between the end of said block of upstream time slots and the beginning of the MAP Time Division Duplex time allocated to downstream data from the master modem to the slave modems is at least twice the spread time.

19. The method of claim 18, in which the propagation time between the master modem and said nearest slave modem is a span time; and
the time allocated to said block of upstream time slots varies according to said span time.

20. The method of claim 16, in which said frequency is a plurality of frequencies, and said frequencies are modulated with data in a manner so that the spectral spread induced in said frequencies due to data modulation is such as to avoid overlap between said frequencies.

21. The method of claim 16, in which said frequencies is a plurality of orthogonally modulated frequencies, and said frequencies are modulated with data in a manner so that the spectral spread induced in said frequencies due to data modulation results in some overlap between said frequencies, but said overlap may be compensated for due to the orthogonal nature of the frequency modulation.

22. The method of claim 16, in which said MAP Time Division Duplex scheme dynamically allocates slots for upstream transmission on the basis of upstream data requests by each of said plurality of slave modems.

23. The method of claim 16, in which any of said master modem or said slave modems determines either path distortions or signal strength loss on its respective CATV cable tree path between said master modem and said slave modems; and in which said master modem and said slave modems exchange information pertaining to said path distortions or signal strength loss.

24. The method of claim 23, in which any of said slave modems communicate either said path distortions or signal strength loss on its respective CATV cable path to said master modem, and said master modem uses said path distortions or signal strength loss to construct its MAP Time Division Duplex allocation scheme.

25. The method of claim 23, in which any of said master modems or said slave modems modulate the power of its transmitted signal according to the signal strength path loss or path distortion on its CATV cable tree path between said master modem and said slave modems.

26. The method of claim 23, in which any of said master modem or said slave modems precode its transmissions to compensate for path distortions on its respective CATV cable tree path between said master modem and said slave modems.

27. The method of claim 16, in which time synchronizing the slave clocks of said plurality of slave modems to the master clock of said master modem is done by having said master modem transmit a tone or periodic sequence to said plurality of slave modems.

28. The method of claim 16, in which said master modem is a Cable Fiber Terminal device that transmits and receives at least some data using shadow optical fiber; or in which said master modem sends its signals to said slave modems through a shadow optical fiber and a Cable Fiber Terminal device.

* * * * *